United States Patent
Morrow

(10) Patent No.: US 7,640,422 B2
(45) Date of Patent: Dec. 29, 2009

(54) SYSTEM FOR REDUCING NUMBER OF LOOKUPS IN A BRANCH TARGET ADDRESS CACHE BY STORING RETRIEVED BTAC ADDRESSES INTO INSTRUCTION CACHE

(75) Inventor: Michael William Morrow, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 11/464,996

(22) Filed: Aug. 16, 2006

(65) Prior Publication Data

US 2008/0046702 A1    Feb. 21, 2008

(51) Int. Cl.
G06F 9/32    (2006.01)
(52) U.S. Cl. .................................................... 712/238
(58) Field of Classification Search .......... 712/237–238
See application file for complete search history.

(56) References Cited

U.S. PATENT DOCUMENTS

| | | | |
|---|---|---|---|
| 4,722,050 A * | 1/1988 | Lee et al. | 712/205 |
| 5,093,778 A * | 3/1992 | Favor et al. | 712/240 |
| 5,136,697 A * | 8/1992 | Johnson | 712/239 |
| 5,774,710 A * | 6/1998 | Chung | 712/238 |
| 6,324,643 B1 | 11/2001 | Krishnan | |
| 6,427,192 B1 * | 7/2002 | Roberts | 711/133 |
| 6,651,162 B1 | 11/2003 | Levitan | |
| 2005/0132173 A1 | 6/2005 | Moyer | |

OTHER PUBLICATIONS

IBM Technical Disclosure Bulletin, Improving Instruction Cache Branch Prediction with Target Addresses, V 36, I 7, pp. 497-498, Jul. 1, 1993.*
Johnson, Mike, Superscalar Microprocessor Design, Prentice Hall, 1991, pp. 71-77.*
Webster's Ninth New Collediate Dictionary, Merriam-Webster Inc., 1990, pp. 96.*

* cited by examiner

*Primary Examiner*—Richard Ellis
(74) *Attorney, Agent, or Firm*—Nicholas J. Pauley; Peter M. Kamarchik; Sam Talpalatsky

(57) ABSTRACT

A technique for reducing lookups to a branch target address cache (BTAC) is disclosed. In this technique, a branch target address is retrieved from the BTAC in response to a miss in looking up an instruction address in an instruction cache (I-cache). The branch target address is associated with the instruction address. The branch target address retrieved from the BTAC is stored in the I-cache. With this disclosed technique, subsequent instruction addresses are looked up in the I-cache, nonparallel to the BTAC, thus saving power by reducing needless BTAC lookups.

21 Claims, 4 Drawing Sheets

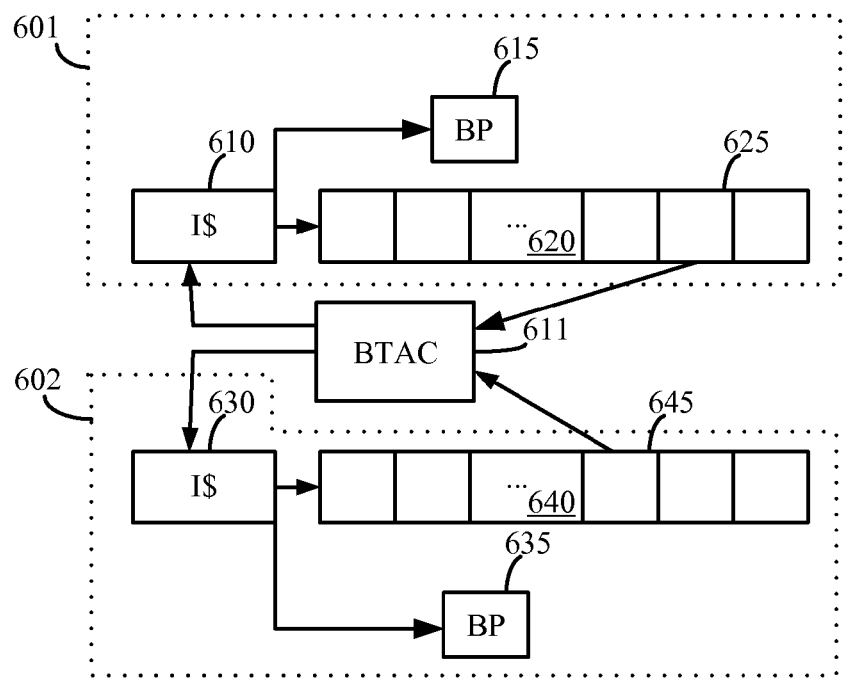

SYSTEM FOR REDUCING NUMBER OF LOOKUPS IN A BRANCH TARGET ADDRESS CACHE BY STORING RETRIEVED BTAC ADDRESSES INTO INSTRUCTION CACHE

FIELD OF THE INVENTION

The present invention relates generally to the field of processors and, in particular, to a method of improving branch prediction by reducing lookups in a branch target address cache.

BACKGROUND

Microprocessors perform computational tasks in a wide variety of applications. Improved processor performance is almost always desirable, to allow for faster operation and/or increased functionality through software changes. In many embedded applications, such as portable electronic devices, conserving power and faster throughput are also goals in processor design and implementation.

Many modern processors employ a pipelined architecture, where sequential instructions, each having multiple execution steps, are overlapped in execution. For improved performance, the instructions should flow continuously through the pipeline. Any situation that causes instructions to stall in the pipeline can detrimentally influence performance. If instructions are flushed from the pipeline and subsequently re-fetched, both performance and power consumption suffer.

Most programs include indirect branch instructions where the actual branching behavior is not known until the indirect branch instruction is evaluated deep in the pipeline. To avoid the stall that would result from waiting for actual evaluation of the indirect branch instruction, modern processors may employ some form of branch prediction, whereby the branching behavior of indirect branch instructions is predicted early in the pipeline. Based on the predicted branch evaluation, the processor speculatively fetches (prefetches) and process instructions from a predicted address—either the branch target address (if the branch is predicted to be taken) or the next sequential address after the branch instruction (if the branch is predicted not to be taken). Whether an indirect branch instruction is to be taken or not to be taken is referred to as determining the direction of the branch.

Conventional branch prediction techniques include a branch target access cache (BTAC) positioned in a fetch stage of a processor pipeline and branch prediction logic. The BTAC stores the target address of an instruction previously fetched and is indexed by the instruction's address. I-caches are conventionally populated with instructions of various instruction types which were retrieved from a higher order cache or memory. BTACs are conventionally populated after an indirect branch instruction is actually resolved further down in the processor pipeline.

In operation, conventional branch prediction techniques perform address lookups on prefetched instructions in both a BTAC and an I-cache in parallel. If there is a miss in the BTAC, these conventional branch techniques have thus consumed power in the BTAC lookup without finding a match. If there is a hit in the BTAC, the address looked up may be considered to be an indirect branch instruction. After BTAC lookup, conventional techniques invoke the branch prediction logic to determine whether a branch target address retrieved from the BTAC should be predicted taken or not. If the branch prediction logic predicts taken, the branch prediction logic redirects instruction flow by retrieving instructions beginning from the branch target address.

Any sequential instructions which entered the processor pipeline since the branch instruction are typically flushed from the pipeline. The path defined by the BTAC lookup and subsequent branch prediction is typically a critical speed path because the shorter the timing of this path the smaller the amount of instructions which need to flushed from the processor pipeline before redirecting the instruction flow. Consequently, it is desirable for this path to be as short as possible to minimize the power expended in flushing instructions.

Conventional techniques for reducing the time of the critical path include reducing the size of the BTAC and/or organizing the BTAC in a multi-way fashion. However, by reducing the size of the BTAC, the number of potential hits and, thus, the probability for finding a branch target address in the BTAC is reduced, lowering the effectiveness of the BTAC as a whole. Furthermore, by organizing the BTAC into a multi-way fashion, indexing into the BTAC may become quicker but time spent comparing may be increased. In these situations, the BTAC may be slower than the I-cache, thus, becoming the limiting factor in the parallel lookup portion of the critical path. Therefore, it is recognized that apparatus and methods are needed to reduce the time for redirecting instruction flow when an indirect branch instruction is found in a processor pipeline without decreasing the effectiveness of branch prediction.

SUMMARY

The present disclosure recognizes that conventional branch prediction techniques often needlessly consume power when lookups are made to an I-cache and BTAC in parallel and the lookups fail in the BTAC. This recognition is more evident when there is a hit in the I-cache and a miss in the BTAC which is likely due to the I-cache typically storing all types of instructions and the BTAC typically storing branch instruction addresses.

According to one embodiment, a method for reducing lookups to a branch target address cache (BTAC) is disclosed. In this method, a branch target address is retrieved from the BTAC in response to a miss in looking up an instruction address in an instruction cache (I-cache). The branch target address is associated with the instruction address. The branch target address retrieved from the BTAC is stored in the I-cache. With this disclosed techniques, subsequent instruction addresses are advantageously looked up in the I-cache, nonparallel to the BTAC, thus saving power by reducing needless BTAC lookups.

According to another embodiment, method of storing branch instructions into an instruction cache is disclosed. This method includes looking up a branch instruction address in an instruction cache (I-cache), retrieving a branch target address from a branch target address cache (BTAC) in response to an I-cache miss, and storing the branch target address into an entry in the I-cache.

Another embodiment relates to a system for reducing lookups to a branch target address cache (BTAC). The system includes a BTAC and an instruction cache (I-cache) configured to retrieve a branch target address from the BTAC in response to a cache miss when looking up a first branch instruction address. The I-cache is further configured to store the branch target address.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

BRIEF DESCRIPTION OF THE DRAWINGS

FIGS. 2A-2C (collectively FIG. 2) illustrate a listing of an exemplary code segment and exemplary contents of an I-cache and a BTAC when the I-cache does not contain the branch instruction from the code segment.

FIG. 3 illustrates exemplary contents of the I-cache of FIG. 2B after the I-cache is populated with instruction data from the BTAC.

FIG. 6 is a functional block diagram of two processors sharing a common BTAC.

DETAILED DESCRIPTION

Figure 1:
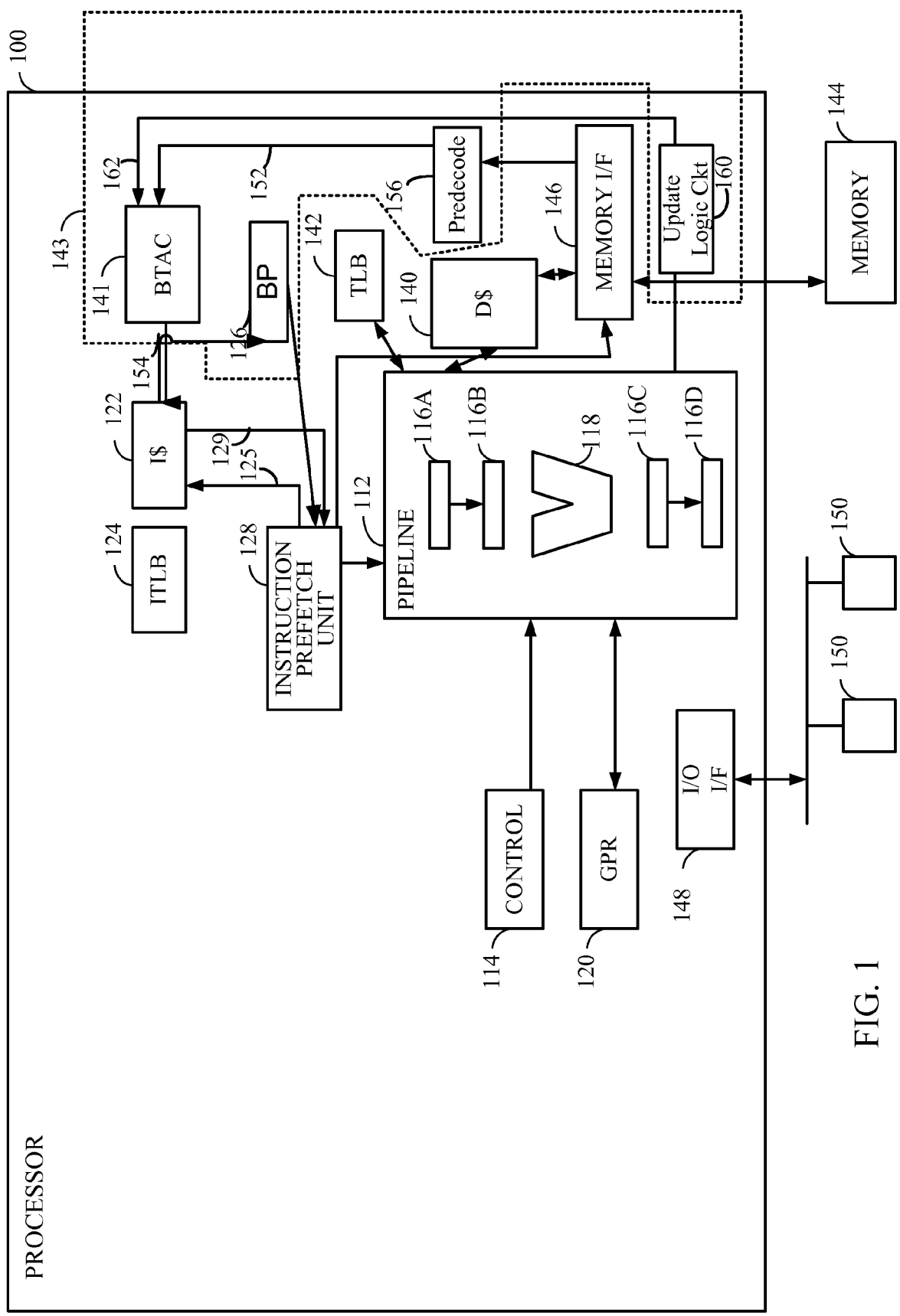
FIG. 1 is a functional block diagram of an exemplary processor.

FIG. 1 depicts a functional block diagram of an exemplary processor 100. The processor 100 executes instructions in an instruction execution pipeline 112 according to control logic 114. In some embodiments, the pipeline 112 may be a superscalar design, with multiple parallel pipelines as described in further detail in connection with FIG. 6. The pipeline 112 includes various registers or latches 116A-D, organized in pipe stages, and one or more execution units such as arithmetic logic unit (ALU) 118. A General Purpose Register (GPR) file 120 provides registers comprising the top of the memory hierarchy.

Data is accessed from a data cache (D-cache) 140, with memory address translation and permissions managed by a main Translation Lookaside Buffer (TLB) 142. In various embodiments, the ITLB 124 may comprise a copy of part of the TLB 142. Alternatively, the ITLB 124 and TLB 142 may be integrated. Similarly, in various embodiments of the processor 100, the I-cache 122 and D-cache 140 may be integrated, or unified. Misses in the I-cache 122 and/or the D-cache 140 cause an access to main (off-chip) memory 144, under the control of a memory interface 146. Misses in the I-cache 122 will be described in further detail in connection with the discussion of FIG. 4.

The processor 100 may include an Input/Output (I/O) interface 148, controlling access to various peripheral devices 150. Those of skill in the art will recognize that numerous variations of the processor 100 are possible. For example, the processor 100 may include a second-level (L2) cache for either or both the I and D caches 122, 140. In addition, one or more of the functional blocks depicted in the processor 100 may be omitted from a particular embodiment.

Processor 100 includes a branch prediction system 143. The branch prediction system 143 includes a BTAC 141, a branch predictor (BP) circuit 126, update logic circuit 160, and an optional predecode circuit 156. The BTAC 141 is configured to store one or more entries where each entry contains a branch instruction address and a branch target address corresponding to a fetch address. The BTAC 141 may store a combination of direct and indirect branch instruction addresses.

The I-cache 122 and BTAC 141 are populated over a fill path 152 when an instruction address misses in the I-cache 122 and a request to receive the corresponding instruction from higher level memory over memory interface 146 is made. Once the instruction is received from memory interface 146, in a first embodiment, optional predecode logic circuit 156 is configured to determine whether received instruction is an indirect branch instruction. If it is, the received instruction's address is looked up in BTAC 141 over path 152 to see if there is a target address associated with the received instruction's address. If there is a hit in the BTAC 141, the received instruction and corresponding target address are written to I-cache 122. A miss in I-cache 122 and a hit in BTAC 141 may occur in a situation where an indirect branch instruction is mispredicted, thus causing some type of invalidation in I-cache 122. The types of I-cache invalidation will be discussed in further detail in connection with the discussion of FIG. 5. If the received instruction's address is not in the BTAC 141 (e.g. a miss), the received instruction is written to I-cache 122.

A second embodiment removes the predecode logic circuit 156. In the second embodiment, instructions received through memory interface 146 will be looked up in BTAC 141 regardless of whether the received instruction is an indirect branch instruction. In this second embodiment, instructions, like the first embodiment, are forwarded to I-cache 122 for storing. However, in the first embodiment, BTAC lookups are limited to indirect branch instructions. In either embodiment, if a branch target address is stored in BTAC 141, it will also be stored to I-cache 122.

Update control logic 160 adds a target address to the entry in the BTAC 141 after actual branch resolution takes place in the later stages of pipeline 112 over path 162. BTAC 141 updates I-cache 122 over path 154 to include both the indirect branch instruction and its corresponding target address. The term "predict not taken" refers to the BP circuit 126 predicting not to redirect the pipeline 112 in accordance with the branch target address.

With memory address translation and permissions managed by an Instruction-side Translation Lookaside Buffer (ITLB) 124, instruction prefetch unit 128 fetches instructions from an instruction cache (I-cache or I$) 122 over path 125. If a fetched instruction is found (e.g. hit) in I-cache 122 and the fetched instruction is associated with a corresponding branch target address, the BP circuit 126 predicts whether to take or not take a code path beginning at the target address. If the BP circuit 126 predicts that the target address should be taken, instruction prefetch unit 128 adjusts its program counter to begin fetching instruction from the target address, thus, redirecting the pipeline 112 in accordance with the branch target address. If the BP circuit 126 predicts that the target address should not be taken, the program counter is incremented to begin fetching instruction from the next sequential address. The operation of branch prediction system 143 will be described in more detail in connection with the discussion of FIGS. 4 and 5.

The present disclosure contemplates an embodiment of combining the BTAC 141 and the I-cache 122 into an integral component. However, there are several reasons for separating the BTAC and I-cache into distinct components. An external BTAC as disclosed is only queried or read during fills into the I-cache. A conventional BTAC which is positioned in parallel with the I-cache is accessed each time the I-cache is accessed. By limiting the consulting of the BTAC as presently disclosed, the present disclosure saves power by reducing activity in the BTAC. Furthermore, this infrequent access of the BTAC allows the BTAC 141 to be a single-ported device, thus reducing design complexity.

FIG. 2A illustrate a listing 210 of an exemplary code segment containing an indirect branch instruction 212 at address 0x000B. As depicted, the target of indirect branch instruction 212 is defined by the contents of register 1 (R1). Since the contents of R1 may vary each time indirect branch instruction 212 is executed, branch prediction system 143 is utilized to determine whether to redirect the process pipeline 112 starting with the address as specified by the contents of R1.

FIG. 2B illustrates exemplary contents of the I-cache 230. I-cache 230 may suitably be similar to I-cache 122. I-cache 230 includes an instruction column 232, a valid bit column 234, and a branch target address column 236. An entry in column 232 represents an instruction. By convention, a "0" value in column 234 indicates that the branch target, if any, in column 236 is invalid whereas a "1" value in column 234 indicates that the branch target in column 236 along in the same row is valid. As depicted, I-cache 230 at a point in time where the program counter points to address 0x000B does not contain an entry for indirect branch instruction 212 at address 0x000B.

FIG. 2C illustrates exemplary contents of BTAC 250. BTAC 250 may suitably be similar to BTAC 141. BTAC 250 includes branch instruction address column 252 and target address column 254. Column 252 may include direct branch instruction addresses, indirect branch instruction addresses, or any combination thereof. At the point in time where the program counter points to address 0x000B, BTAC 250 contains an indirect branch instruction address 256 and its corresponding target address. Consequently, control logic 114 will cause the branch instruction 256 and its corresponding target address in BTAC 250 to be stored in I-cache 230 on an I-cache miss. It is recognized that other information may be stored in both the I-cache 230 and BTAC 250 and that various organizations of I-cache 230 and BTAC 250 are contemplated by the present disclosure.

In general, instructions enter the IC stage 102 and propagate to the next stage in the next cycle. At 215, the MOV LR, PC instruction is in the decode stage 106. At that point in time, decode stage 106 recognizes the MOV LR, PC and stores the return address, MOV+8, into the link stack structure. For nomenclature purposes, MOV+8 refers to adding an offset of eight to the address of the MOV instruction. The value eight includes the four bytes of the MOV instruction and the four bytes of the subsequent BR instruction so that the link stack structure contains the address of the sequential instruction after the BR instruction. As will be discussed further in connection with the discussion of FIGS. 3-4, a decode stage according to the present teachings of the disclosure adds the offset of eight to the address of the MOV instruction. As will be discussed further in connection with the discussion of FIG. 5, an alternative decode stage according to the present teachings of the disclosure adds an offset of four to the address of the BR instruction. It should be noted that both notations MOV+8 and BR+4 refer to address 0x00899908, the return address. At reference 220, the link stack structure shows its contents to be MOV+8. When the BR instruction is processed at reference 218 by the decode stage 106, the target of the branch instruction, the beginning of the subroutine, is predicted and fetched by the pipeline in the next cycle. At reference 219, the LDA instruction, the beginning of the subroutine, is processed by the IC stage 102. Since the pipeline 105 has been redirected to fetch the LDA instruction due to the prediction of the branch instruction, instructions at addresses BR+4 and BR+8 are flushed from the pipeline. The instructions sequentially following the LDA instruction are then fetched into pipeline 105.

Figure 4:
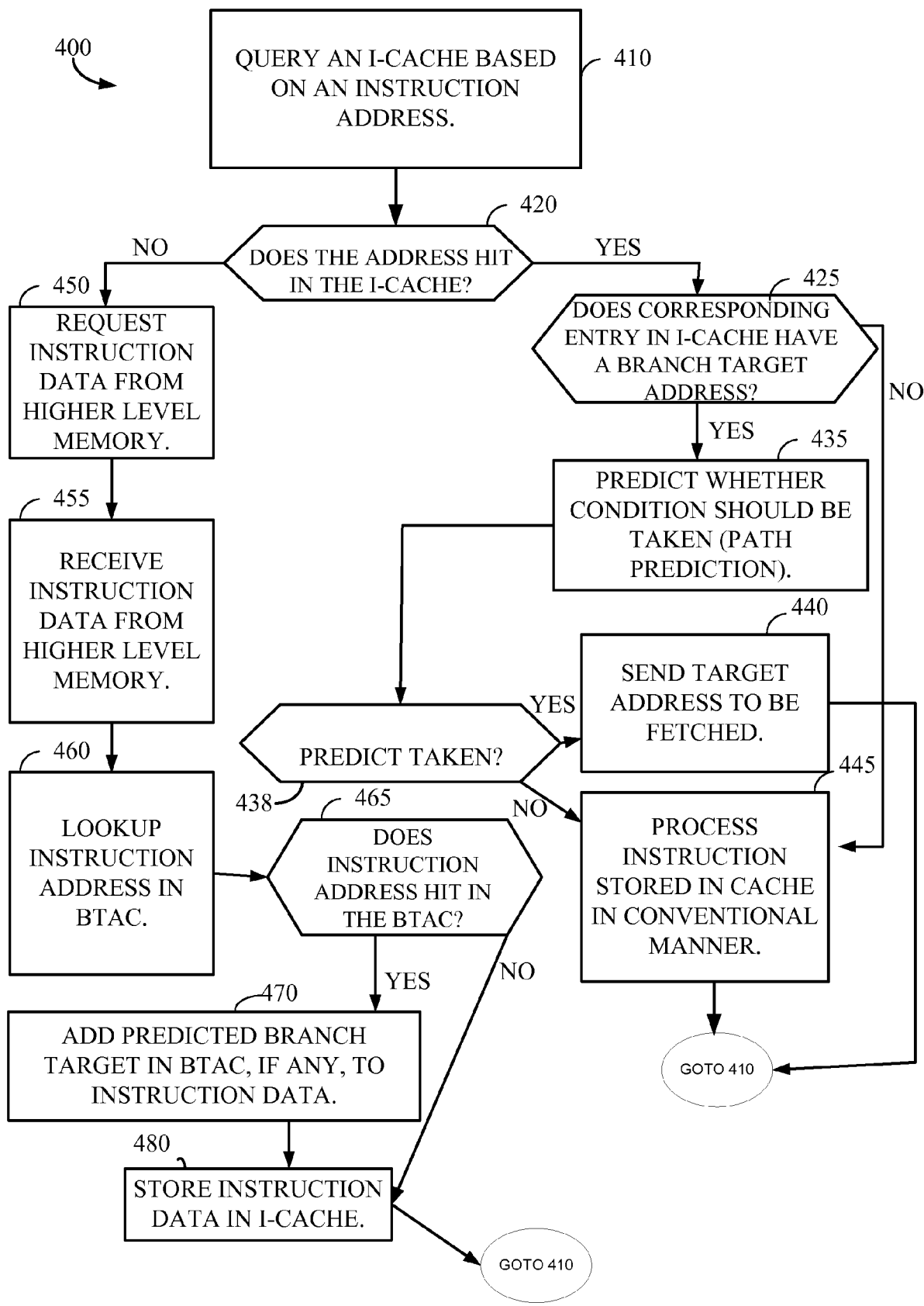
FIG. 4 is a flow chart illustrating a method of storing an indirect branch instruction into an I-cache and retrieving an instruction from the I-cache of FIG. 1.

FIG. 4 is a flow chart illustrating a method 400 of storing an indirect branch instruction into an I-cache and retrieving a branch target address from the I-cache of FIG. 1. Blocks 410, 420, 450, 455, 460, 465, 470, and 480 define the process to store an indirect branch instruction and branch target address into an I-cache such as I-cache 122 of FIG. 1. Blocks 410, 420, 425, 435, 438, 440, and 445 define the process for retrieving a branch target address from an I-cache. At block 410, an I-cache for an instruction based on the instruction's address is queried. For example, the instruction address stored in a processor's program counter may be utilized to query an I-cache. At block 420, the method 400 determines whether there is a hit in the I-cache. If there is not (a cache miss), the method 400 proceeds to block 450 to retrieve the corresponding instruction data from higher level memory. At block 450, instruction data is requested from higher level memory such as a layer 2 (L2) cache or off-chip memory. At block 455, the retrieved instruction data from higher level memory is received. At block 460, instruction address is looked up in the BTAC. At block 465, the method 400 determines whether the instruction address hits in the BTAC or, in other words, matches with an instruction address stored in the BTAC. If the instruction address hits in the BTAC, the method 400 proceeds to block 470 where a predicted branch target, if any, stored in the BTAC is added to the instruction data. On a hit in the BTAC, the predicted branch target will likely be stored in the BTAC as long as the branch target address of a previous instance of the indirect branch instruction has been previously resolved. The method 400 proceeds to block 480 where the instruction data is stored in the I-cache.

Returning to block 465, if the instruction address misses in the BTAC, the method 400 proceeds to block 480. This transition from block 465 to 480 indicates the situation where the queried instruction address is neither in the I-cache or the BTAC. In this situation, a branch target address will be stored in the BTAC after the resolution of the actual branch target for the retrieved instruction data which occurs later in the processor pipeline as discussed in further detail in connection with FIG. 6. When the actual branch target is resolved, for example, update logic circuit 160 will cause both the BTAC and the I-cache to store the resolved branch target.

Both blocks 465 and 475 proceed to block 480 where the instruction data is stored in the I-cache. Otherwise, the program counter is sequentially incremented. The method 400 then proceeds to block 410 to query the next address as specified by the program counter.

Returning to block 420, if there is a hit in the I-cache meaning there is a corresponding entry in the I-cache, method 400 proceeds to block 425. At block 425, the method 400 determines whether the corresponding entry in the I-cache has a branch target address. In one embodiment, block 425 may be accomplished by interrogating a corresponding valid bit such as one stored in the valid bit column 234 of FIG. 2. If there is no valid branch target address associated with the I-cache hit, the instruction address is not an indirect branch instruction. Thus, the method 400 proceeds to block 445 where the non-branch instruction is retrieved from the I-cache and processed in a conventional manner. The method 400 proceeds to block 410 for querying the next address from the I-cache as specified by the program counter.

If there is a valid branch target address corresponding to the entry, the method 400 proceeds to block 435. At block 435, the method 400 predicts whether a branch target address store in the corresponding entry should be taken. In one embodiment, the branch prediction circuit 126 makes this prediction. It should be noted that one skilled in the art will appreciate branch prediction techniques may be utilizing statistics, heuristics, predetermined parameters, and the like. At block 438, the method 400 tests whether the prediction is to be taken. If it is, the method 400 proceeds to block 440 where the branch target address is sent to the program counter such as instruction prefetch unit 128 in order for instructions to begin being fetched from the branch target address. The method 400 proceeds to block 410 to query the next address as specified by the program counter which in this path through the flow chart is the branch target address.

Returning to block 438, if the path is predicted not taken, the method 400 proceeds to block 445 to process the instruction stored in the cache in a conventional manner. After block 445, the method 400 proceeds to block 410 for querying the next address in the program counter which in this path through the flowchart is the sequential address following the indirect branch instruction such as address 0x000C in FIG. 2A, for example.

Figure 5:
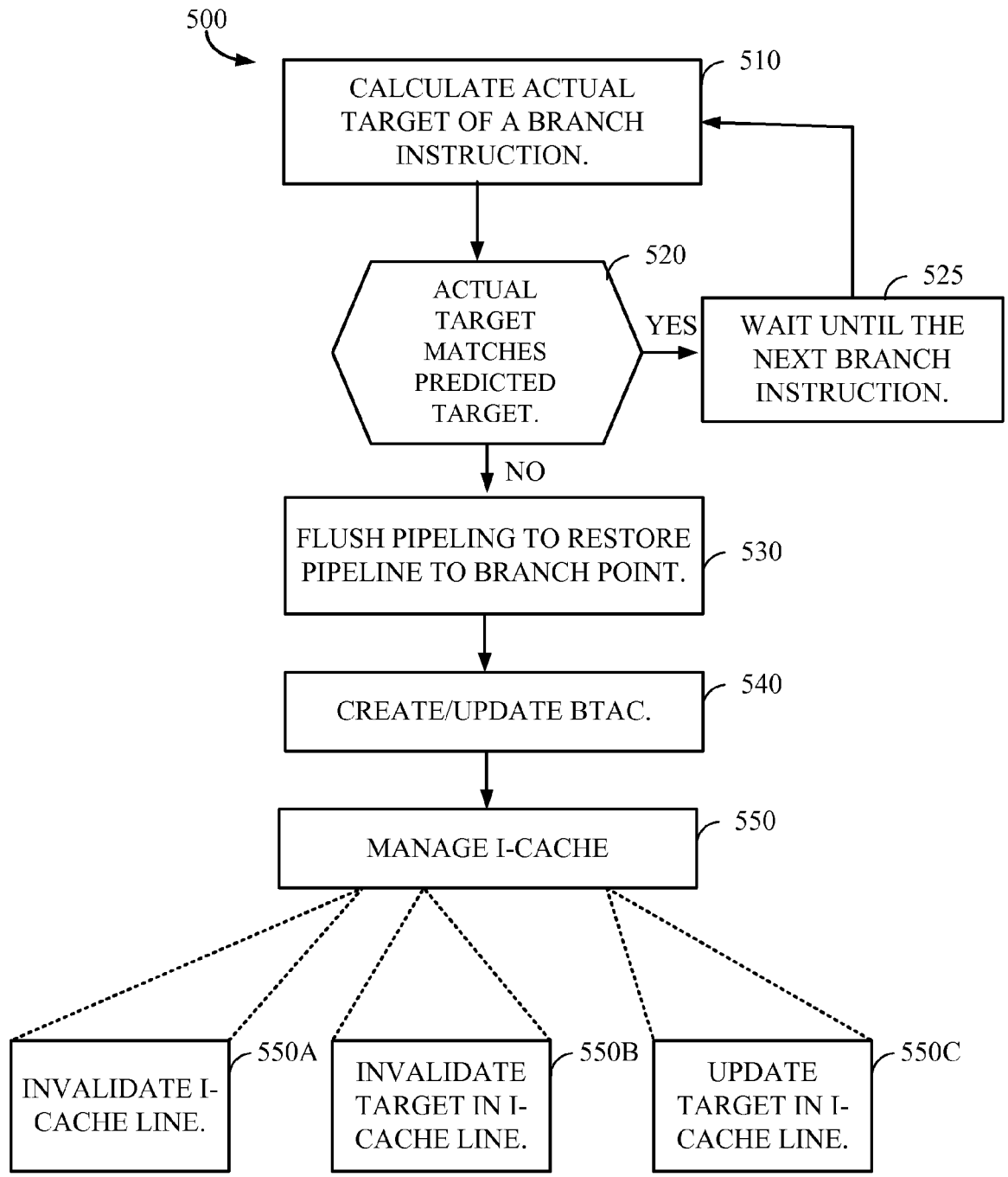
FIG. 5 is a flow chart illustrating a method of managing an I-cache on actual branch resolution.

FIG. 5 is a flow chart illustrating a method 500 of managing an I-cache on actual branch resolution. The method 500 is performed for situations where the actual branch target of an indirect branch instruction is calculated for the first time and where the prediction mechanism such as the branch prediction circuit 126 mispredicts the target of the indirect branch instruction. At block 510, an actual target of an indirect branch instruction is resolved. Such branch resolution may be performed as the indirect branch instruction is processed later in the processor pipeline.

At block 520, the method 500 determines whether the actual target matches the predicted target or, for the case of the actual target is calculated for the first time, there is no predicted target. If the actual branch target does match with the predicted branch target, neither the BTAC or I-cache need to be updated. The method 500 proceeds to block 525 where it waits for the next branch instruction before proceeding back to block 510.

If the actual branch target does not match with the predicted target, the method 500 detects a mispredict and proceeds to block 530. At least two situations may result in a mismatch. The first situation may occur the first time an indirect branch instruction is executed after previously being stored in the BTAC and I-cache without a branch target. In the first situation, the next sequential instruction after the indirect branch instruction may have been loaded in the processor pipeline. The second situation may occur if the predicted target address is different from the actual resolved target address. In the second situation, the next instruction as indicated in the predicted target address may have been loaded in the processor pipeline.

At block 530, the processor pipeline, in either situation, has its instructions flushed from the pipeline to restore the pipeline to the branch point which is, in this case, the address of the indirect branch instruction. Consequently, instructions loaded in the processor pipeline subsequent to the indirect branch instruction regardless of whether those instructions were loaded beginning from a predicted target address or the next sequential address after the indirect branch instruction will be flushed from the processor pipeline. At block 540, the BTAC is updated to store the actual branch target address in its branch target address field such as column 254.

At block 550, the I-cache is managed. For example, control logic circuit 114 may include logic to implement blocks 550A-550C. Blocks 550A-550C are alternative embodiments of block 550. At block 550A, the cache line corresponding to the predicted target address is invalidated. At block 550B, the branch target of the cache line corresponding to the predicted target address is invalidated. At block 550C, the branch target address of the cache line corresponding to the predicted target address is updated to reflect the actual target address. Block 550C is preferable when the first time an indirect branch instruction is executed after previously being stored in the BTAC and I-cache without a branch target.

FIG. 6 is a functional block diagram of two processors 601 and 602 sharing a common BTAC 611. The shared BTAC 611 and processors 601 and 602 are preferably embodied in a single integrated circuit chip. Processor 601 includes its own multi-stage processor pipeline 620, I-cache 610, and branch prediction circuit 615. At stage 625, actual branch resolution takes place in order to update BTAC 611 and I-cache 610 with an indirect branch instruction and branch target address as previously described in FIGS. 4 and 5, respectively. Processor 602 includes its own multi-stage processor pipeline 640, I-cache 630 and branch prediction circuit 635. At stage 645, actual branch resolution takes place in order to update BTAC 611 and I-cache 630 with an indirect branch instruction and branch target address as previously described in FIGS. 4 and 5, respectively. As depicted, actual branch resolution may be performed at different stages in the processors' pipeline. Although FIG. 6 illustrate a common BTAC shared between two processors, it is noted that the present disclosure contemplates sharing a common BTAC between three or more processors. During operation, when an address is fetched from either I-cache 610 or I-cache 630 that contains a valid branch target address, the respective pipelines 620 and 640 begin prefetching instructions beginning from the branch target address.

To ensure that the link stack structure 134 is not needlessly written, the select/enable logic circuit 510 receives as input predicted taken signals 550A and 55GB corresponding to instruction addresses $DCD_0$ and $DCD_1$, respectively, from the branch prediction circuit 132. If an implicit subroutine call is recognized in a processor pipeline and the implicit subroutine has been predicted taken by branch prediction circuit 132, the select/enable logic circuit 510 generates a write enable signal 545 to the link stack structure 134 to enable it for being written. If an implicit subroutine call is recognized but is predicted not taken, the select/enable logic circuit 510 does not generate a write enable to the link stack structure 134. In this way, implicit subroutine calls which are predicted not taken do not result in writing to the link stack structure 134. It should be noted that although the present disclosure describes the recognition of an implicit subroutine call and the writing to the link stack structure in the decode stage pipeline, one skilled in the art would recognize that these aspects of the invention may be practiced in any stage of a processor pipeline where predecode bits have been determined and a branch prediction has been made.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below.

What is claimed is:

1. A method of reducing lookups to a branch target address cache (BTAC) using an instruction cache (I-cache), the method comprising:

retrieving a first branch target address from the BTAC in response to a miss in looking up a first instruction address of a first branch instruction stored in the I-cache; and storing the first branch target address retrieved from the BTAC in the I-cache at a first location associated with the first instruction address,
wherein the I-cache is configured to store a plurality of instructions including the first branch instruction, wherein the first branch target address retrieved from the BTAC and stored in the I-cache was provided to the BTAC in response to detection of a prior branch resolution of the first branch instruction in a processing stage of a pipeline; and
in response to a lookup of the first instruction address at the I-cache, retrieving the first branch target address from the I-cache when the first branch target address is stored at the I-cache.

2. The method of claim 1, further comprising detecting a mispredict associated with the first branch instruction.

3. The method of claim 2, further comprising performing at least one of:
invalidating an I-cache line associated with the mispredict;
invalidating the branch target address in the I-cache line; and
updating the branch target address in the I-cache.

4. The method of claim 2, wherein detecting the mispredict comprises:
calculating an actual branch target address associated with the first branch instruction; and
determining that the actual branch target address does not match the first branch target address stored in the I-cache.

5. The method of claim 1, further comprising:
receiving a second branch target address from the BTAC in response to a second miss in looking up a second instruction address in a second I-cache; and
storing the second branch target address in the second I-cache at a second location associated with the second instruction address.

6. The method of claim 1, wherein lookups in the BTAC are limited to situations where a particular indirect branch instruction is not found in the I-cache.

7. The method of claim 1, further comprising updating the BTAC and updating the I-cache with a resolved target address received from the pipeline.

8. The method of claim 1, further comprising updating the I-cache by providing resolved target address data to the I-cache in response to detection of a branch resolution at the pipeline.

9. A method comprising:
looking up a branch instruction address associated with a branch instruction in an instruction cache (I-cache);
retrieving a branch target address from a branch target address cache (BTAC) in response to an I-cache miss associated with the branch instruction;
storing the branch target address retrieved from the BTAC into an entry in the I-cache, wherein the entry is associated with the branch instruction address in the I-cache, wherein the branch target address retrieved from the BTAC was provided to the BTAC in response to detection of a prior branch resolution of the branch instruction in a processing stage of a pipeline; and
in response to a lookup of the branch instruction address at the I-cache, retrieving the branch target address from the I-cache when the branch target address is stored at the I-cache.

10. The method of claim 9, further comprising predicting that a next instruction to be fetched is associated with the branch target address.

11. The method of claim 10, further comprising updating the branch target address in the I-cache when the prediction is incorrect.

12. The method of claim 11, wherein updating the branch target address further comprises:
receiving from the pipeline an actual branch target address of the branch instruction; and
replacing the branch target address stored in the I-cache and in the BTAC with the actual branch target address.

13. The method of claim 9, further comprising:
looking up a second branch instruction address in a second I-cache;
retrieving a second branch target address from the BTAC in response to a second I-cache miss; and
storing the second branch target address retrieved from the BTAC into a first entry in the second I-cache.

14. The method of claim 9, wherein lookups in the BTAC are limited to situations where a particular indirect branch instruction is not found in the I-cache.

15. An apparatus to reduce lookups to a branch target address cache (BTAC) using an instruction cache (I-cache), the apparatus comprising:
the BTAC; and
the I-cache, wherein the I-cache is configured to:
store instructions including a first branch instruction;
retrieve a branch target address from the BTAC in response to an I-cache miss when looking up a first branch instruction address in the I-cache, wherein the first branch instruction address is associated with the first branch instruction that is stored in the I-cache;
store the branch target address retrieved from the BTAC; and
in response to a lookup of the first branch instruction address at the I-cache, provide the branch target address from the I-cache when the branch target address is stored at the I-cache,
wherein the branch target address retrieved from the BTAC was provided to the BTAC in response to detection of a prior branch resolution of the first branch instruction in a processing stage of a pipeline.

16. The apparatus of claim 15, farther comprising a branch prediction circuit configured to predict that a second instruction to be fetched is associated with the branch target address stored in the I-cache.

17. The apparatus of claim 16, wherein the I-cache is further configured to provide the branch target address in response to a request to fetch the second instruction.

18. The apparatus of claim 17, further comprising an update logic circuit configured to resolve a misprediction of the second instruction to be fetched.

19. The apparatus of claim 18, further comprising a control logic circuit configured to manage the I-cache by at least one of invalidating an I-cache line that includes the branch target address, invalidating the branch target address in the I-cache line, and updating the branch target address in the I-cache.

20. The apparatus of claim 15, wherein the BTAC is shared between two or more processors.

21. The method of claim 15, wherein lookups in the BTAC are limited to situations where a particular indirect branch instruction is not found in the I-cache.

* * * * *